United States Patent Office

3,794,508
Patented Feb. 26, 1974

3,794,508
MODIFIED ALKALI HEXATITANATE AND
PROCESS OF PRODUCING SAME
Gerhard Winter and Manfred Mansmann, Krefeld, Germany, assignors to Bayer Aktiengesellschaft, Leverkusen, Germany
No Drawing. Filed Sept. 29, 1972, Ser. No. 293,658
Claims priority, application Germany, Sept. 29, 1971,
P 21 48 599.4
Int. Cl. C09c 1/36
U.S. Cl. 106—299                                 15 Claims

ABSTRACT OF THE DISCLOSURE

Modified fibrous alkali metal hexatitanates characterized by a content of polyvalent metal ions in an amount of from 0.025 to 30% by weight of metal and by a content of fluorine ions in an amount of from 0.05 to 10% by weight of fluorine, based on the weight of titanium dioxide in the alkali metal hexatitanate, and process of producing same by reacting a titanium compound with an alkali metal compound which reacts basically in the presence of a mineralizer at a temperature of from 700 to 1200° C. and in the presence of a polyvalent metal fluoride in an amount of 0.1 to 15% by weight, based on the weight of the dry reaction mixture, and the utility thereof as pigments, insulating materials, catalysts and catalyst supports.

---

This invention relates to modified alkali metal hexatitanates in fibrous form and to a process for their production.

Water-insoluble, alkali metal titanates in fibrous form are suitable for many different purposes, depending upon the size of the fibres. Fibres with a diameter ranging from about 1 to 3 microns are used for example for strengthening plastics or fibrous materials or for the production of heat-insulating materials. Fibres with a diameter ranging from about 0.1 to 0.5 micron have pigment characteristics and can be used as white pigments. There are also other fields of application, for example the fibres can be used as fillers or even for the production of lubricants in admixture with oils. Alkali metal hexatitanates having the composition $M_2O \cdot 6TiO_2 (=M_2Ti_6O_{13})$ are more suitable for a number of these applications than titanates richer in alkali metal such as, for example, the tetra-, tri- or di-titanates because the latter are more chemically active, more unstable and more sensitive to hydrolysis with increasing alkali metal content.

Fibrous alkali metal titanates with particle sizes in the pigment range can be used for pigmenting paper. It is preferred to use alkali metal hexatitanates for this purpose because they have a relatively high refractive index, amounting to substantially 2.3 in the case of $K_2Ti_6O_{13}$, for example, which is of considerable importance to the hiding power and tinting strength and because they are able, by virtue of their fibrous form, to mat with the celluose fibres of the paper pulp and to remain incorporated therein during filtration (high retention), whilst spherical pigment particles are washed out much more easily. This accounts for the surprising fact that a paper pigmented with $K_2Ti_6O_{13}$, for example, has a higher hiding power than a paper in which an equivalent quantity of anatase was used for pigmenting although at $n=2.5$ the refractive index of anatase is higher than that of the potassium hexatitanate.

Alkali metal polytitanates have been known for some considerable time. According to United States patent specification No. 1,929,521 they can be produced by heating an intimate mixture of a titanium compound with a basically reacting alkali metal compound to a temperature of below 800° C. to more than 1000° C.

It is known that fibrous alkali metal polytitanates can be produced by high-pressure hydrothermal processes and melting processes.

DAS No. 1,252,645 relates to a process for the production of water-insoluble alkali metal titanates in fibrous form by calcining a solid reaction mixture of a basic, oxygen-containing alkali metal compound and an oxygen-containing titanium compound. It is possible to control the particle size by careful control of the reaction temperature. Thus, calcination is carried out at a temperature of from 600 to 850° C. in order to produce alkali metal titanate fibres in the colloidal particle size range (particle diameter 0.005 to 0.1 micron), at a temperature of from 850 to 975° C. in order to produce pigment particles (particle diameter 0.1 to 0.6 micron) and at a temperature of from 975 to 1150° C. in order to produce insulating or strengthening fibres (particle diameter 0.6 to 3 microns). For producing the pigmentary alkali metal titanate, it is preferred to add from 10 to 50% of alkali metal chloride to the reaction mixture, in which case the reaction takes from 0.75 to 4 hours at 850 to 975° C.

However, the considerable dependence of the particle size or, more precisely, the fibre diameter, upon temperature involves certain disadvantages. For example, in order to produce a pigment with favorable optical properties, the particle size distribution is best situated within very narrow limits around the optimum value, any oversized or undersized particles resulting in a marked decrease in the optical performance. In the case of fibrous alkali metal hexatitanates, the fibrous particles should come as close as possible to the optimum diameter of substantially 0.3 micron which, in the conventional process, can only be achieved by keeping to a very narrow temperature range for all the particles. In practice, conditions such as these can only be achieved at considerable expense.

The present invention relates to modified fibrous alkali metal hexatitanates, characterized by a content of one or more polyvalent metal ions in a quantity of from 0.025% to 30% by weight of metal, and by a content of fluorine ions in a quantity of from 0.05 to 10% by weight of fluorine, based on $TiO_2$ in the alkali metal hexatitanate.

The modified alkali metal hexatitanates preferably contain the polyvalent metal ions in a quantity of from 0.1 to 15% by weight of the metal and the fluorine ions in a quantity of from 0.05 to 3% by weight of fluorine. White modified fibrous alkali metal hexatitanates contain as metal ions colorless polyvalent metal fluorides such as, for example, $CaF_2$, $CdF_2$, $SrF_2$, $PbF_2$, $AlF_3$, $BiF_3$ or $ThF_4$, preferably $CdF_2$, $CaF_2$ and $AlF_3$. Colored modified fibrous alkali metal hexatitanates contain coloring metal fluoride, such as, for example, $CeF_3$, $CeF_4$, $CoF_2$, $MnF_2$, $CrF_3$ or $K_3KeF_6$, depending upon the color required, optionally in admixture with the polyvalent metal fluorides referred to above.

The invention also relates to a process for producing modified fibrous alkali metal hexatitanates by reacting a titanium compound with an alkali metal compound which reacts basically under the reaction conditions in the presence of a mineralizer at a temperature in the range of from 700 to 1200° C., wherein the reaction is carried out in the presence of one or more polyvalent metal fluorides used in quantities of from 0.1 to 15% by weight and preferably in quantities of from 0.5 to 5% by weight, based on the dry reaction mixture.

The modified alkali metal hexatitanates are obtained by a simple calcination process in the absence of any other special measures such as, for example, increased pressure or fusion. The fibrous hexatitanates can be obtained in the aforementioned temperature range merely by using the modifiers according to the process of the invention without any need for complicated tempering and residence-time programmes; the diameter and the length of the fibres being controllable by the type and quantity of modifiers used.

According to the invention, the fibrous stabilized alkali metal hexatitanate pigments are produced by mixing $TiO_2$ or titanium compounds which can be converted into $TiO_2$ under the reaction conditions with an alkali metal compound which reacts basically under the reaction conditions and heating the resulting mixture to the reaction temperature in the presence both of polyvalent metal fluorides and of mineralizers. Thereafter the fibrous alkali metal hexatitanate pigment is recovered by washing the reaction cake.

In addition to $TiO_2$ and the hydrates, examples of titanium compounds which can be converted into $TiO_2$ under the reaction conditions include $TiOSO_4$, $FeTiO_3$, $$K_2[TiO(C_2O_4)_2]$$

titanium metal, TiC, TiN, $TiS_2$, titanium halides, complex titanium halides, titanium subhalides, organic titanium salts, titanic acid esters and other organic titanium compounds. It is preferred to employ the $TiO_2$-hydrolysate sludge which accumulates during pigment production by the hydrolysis of titanium sulphate.

Alkali metal oxides, peroxides, hydroxides, acetates, oxalates, hydrogen tartrates, carbonates, hydrogen carbonates, cyanides, thiocyanates, nitrates, nitrites, amides, sulphides, polysulphides, hydrides and iodides are all examples of alkali metal compounds which react basically under the reaction conditions. In the context of the invention, alkali metal compounds are the corresponding compounds of sodium, potassium, rubidium and cesium, especially those of sodium and potassium. $KOH$, $K_2CO_3$, $Na_2CO_3$, $NaHCO_3$, $KHCO_3$ or $NaOH$ are most preferably used.

The ratio of alkali metal compound to titanium compound to be adjusted in the reaction mixture, expressed as the ratio of $M_2O:TiO_2$, can amount to in the range of from 1:3 to 1:7. It is preferred to use an $M_2O:TiO_2$ ratio of from 1:5 to 1:6. In every case, alkali metal hexatitanates in fibrous form are formed under the reaction conditions specified, the fibre diameter amounting on average to substantially 0.3 micron whilst the fibres have lengths of from 1 to 50 microns.

Particular importance is attached to the modifiers used in the process according to the invention because without them it is not possible to obtain controlled fibre formation in the reaction mixture. In the presence of the fibre-forming modifiers, fibrous alkali metal titanates with pigment properties are obtained from a variety of different combinations of alkali metal and titanium compounds. The modifiers also have a standardizing effect upon fibre formation so that, above a minimum temperature of substantially 700° C., it is always possible to obtain an optically equivalent fibrous pigment substantially independently of the reaction temperature. The fact that it is unaffected by fluctuations in temperature is a particular advantage of the process according to the invention. Also, only pure alkali metal hexatitanates are formed under the reaction conditions and, furthermore, the fibre-forming modifiers promote a particularly rapid pigment formation. In most cases, mere heating to the reaction temperature is all that is required to form the alkali metal titanate pigments and there is no need for the reaction mixture to be maintained for prolonged periods at this temperature. By virtue of the modifiers used in accordance with the invention, pigment production can also be carried out at relatively low temperatures. Accordingly, the process according to the invention also has the advantage of being economical in respect of heat energy.

Polyvalent metal fluorides represent suitable fibre-forming modifiers for the purposes of the invention. For example, it is possible to use the fluorides of the alkaline earth metals, $YF_3$, $LaF_3$, $TiF_4$, $ZrF_4$, $ZnF_2$, $SnF_2$, $CaF_2$, $AlF_3$, $CeF_3$, $CeF_4$, $ThF_4$, fluorides of the lanthanides, $SnF_2$, $PbF_2$, $BiF_3$, $UF_4$, $CoF_2$, $CrF_3$, $MnF_2$ in pure form, in admixture or even in the form of complex fluorides such as, for example, $K_2ZrF_6$, $Na_3AlF_6$ or $Na_3FeF_6$. By combining certain fluorides, it is possible in some cases to obtain additional effects such as, for example, influencing the length of the fibres. Where fluorides with coloring ions are used, colored alkali metal hexatitanate fibres are obtained in pigment form. For producing a white pigment, it is preferred to use $AlF_3$, $CdF_2$ or $CaF_2$ as the fibre-forming modifiers. The polyvalent metal fluorides are not only responsible for fibre formation, they also improve the optical properties, for example color and light stability, by modifying the pigments produced in accordance with the invention. Surprisingly, the metal fluorides added are not completely decomposed by the alkaline component which is added to the reaction mixture, instead they remain more or less completely in the fibrous pigment. This is particularly surprising where fluorides of amphoteric metals, for example $AlF_3$ or $ZnF_2$, are added because in the presence of $KOH$ or $K_2CO_3$, for example it can be expected that these fluorides are converted into aluminate or zincate and $KF$. However, the metal fluorides are at least partly incorporated into the fibrous pigment during the reaction and, in this way, contribute towards a remarkable level of light stabilization and improvement in the color of the white pigment. In general, the finished pigment is found after washing to contain the entire quantity of metal introduced as fluoride whilst the fluoride ion can still be detected in proportions of up to about 10 to 70% of the quantity used, depending upon the reaction temperature and the quality of the fluoride. Accordingly, products obtained with the addition of $NaF$ or $KF$, for example, do not contain any fluoride and on exposure to an ultra-violet lamp or to sunlight show a tendency to turn grey. By contrast, the fibrous metal-fluoride-containing white pigments produced in accordance with the invention are not sensitive to light and are distinguished by a particularly pure white color.

The pigments have a desity in the range from 3.15 to 3.35 g./cc. which can be varied slightly depending upon the modifier used. By virtue of their fibrous form and rough surface, they have relatively high specific surfaces of from 10 to 15 m.²/g. according to BET. In addition to the $d$-values quoted for $K_2Ti_6O_{13}$ and $Na_2Ti_6O_{13}$ in the ASTM card index, the X-ray defraction diagrams of the products produced in accordance with the invention have another distinct reflex which corresponds to a $d$-value of 5.04 A. and which occurs independently of the composition of the modifier used. This reflex is characteristic of the products produced in accordance with the invention.

In cases where colored metal fluorides are used as the fibre-forming modifiers, the alkali metal hexatitanate pigment fibres have a color which is attributable to the fluorides incorporated into the crystal lattice of the alkali metal hexatitanate but which differs considerably from the color of the pure fluorides and oxides. For example, pigment particles showing tinges of yellow to green are formed with $CeF_3$, whilst the alkali metal hexatitanates formed with $CeF_4$ show tinges of green, those formed with $CoF_2$ are flesh-colored, those formed with $MnF_2$ are cocoa brown in color, those formed with $CrF_3$ are yellowish brown in color and those formed with $K_3FeF_6$ beige in color. It is possible to obtain numerous different colors and tints by combining differently colored fluorides.

The modifiers required for forming the fibrous pigment are prepared for example by precipitation in the aqueous suspension of the reaction components. In these cases, soluble compounds, for example, neutral or basic nitrates, sulphates, acetates, chlorides, bromides, iodides or hydroxo complexes of the corresponding metals, are used as starting materials. They are added to the suspension of the reaction mixture and the fluorides are precipitated by the addition of a soluble fluoride such as, for example, $NH_4F$, NaF, KF, HF, LiF, RbF, CsF or an alkyl ammonium fluoride. However, the modifiers can also be added as such to the reaction mixture or prepared for example by mixing or grinding the dry components. The fibre-forming modifiers are generally used in a quantity of from 0.1 to 15% and preferably in a quantity of from 0.5 to 5%, based on the dry reaction mixture. The quantity in which they are used is dependent on the temperature applied, on the composition of the reaction mixture and on the activity of the modifiers. As the dry reaction mixture the mixture of the substances in anhydrous form which participate in the reaction is to be understood.

In addition, production of the modified fibrous alkali metal hexatitanate is carried out in the presence of mineralizers.

In conjunction with the fibre-forming modifiers, the mineralizers promote a particularly fast reaction of the reactants and a uniform development of the pigment fibres and they also increase the effectiveness of the modifiers. Suitable mineralizers include alkali metal salts of oxyacids of sulphur such as, for example, $Na_2SO_3$, $K_2SO_4$, $RbSO_4$, $CsSO_4$, $K_2S_2O_7$, $NaHSO_4$, $Na_2S_2O_5$ and $Na_2S_2O_3$, or alkali metal halides. Particularly favorable results are obtained with alkali metal sulphates such as $Na_2SO_4$ and $K_2SO_4$.

The concentration by weight of mineralizer in the dry reaction mixture depends on the activity of the modifiers. Where particularly active metal fluorides, for example $CaF_2$ or $AlF_3$ are present, quantities as small as from 3 to 30% are sufficient, whilst in the case of less active fluorides it is preferable to use concentrations of from 20 to 40%, based on the dry reaction mixture. It is also possible to use higher concentrations without any adverse effect upon pigment formation, although concentrations of below 30% are preferred because then the reaction mixture does not cake and remains dry even at reaction temperatures above the melting point of the mineralizer. The mineralizers used are substantially involatile at the reaction temperature. Surprisingly, $K_2SO_4$, $Rb_2SO_4$ and $Cs_2SO_4$, for example, which have melting points considerably higher than 1000° C. are effective as mineralizers at temperatures as low as substantially 700° C. upwards.

The speed with which pigment formation takes place through co-operation between modifiers and mineralizers was demonstrated in a number of tests. A reaction mixture of $TiO_2$ (prepared by the hydrolysis of titanium tetrabutylate or titanyl sulphate) and $K_2CO_3$ in a molar ratio of 6:1, was heated for 120 minutes to 900° C. and then removed from the furnace and dispersed in water; there were no signs of true fibre formation. By contrast, a reaction mixture prepared in accordance with the invention from $TiO_2$, $K_2CO_3$ (molar ratio 6:1) with 20% of $K_2SO_4$ and 1% $AlF_3$, which was reacted in the same way by heating for 120 minutes to 900° C., resulted in more than 95% composition of pigment fibres.

To prepare the modified fibrous alkali metal hexatitanate pigments, a mixture of the various components is prepared and heated in a reaction furnace. The mixture can be prepared, for example, by grinding the components alkali metal compound, titanium compound, modifiers and mineralizer together in dry form. If, by contrast titanium dioxide sludges of the kind formed, for example, in the production of titanium dioxide by sulphate hydrolysis, are used as the starting materials, the remaining reactants are added to the sludge which is then stirred until homogeneous distribution is obtained, after which a dry reaction mixture is prepared by drying in a screw, on a cylinder or by spray drying. For further preparation, the reaction mixture is then heated to the reaction temperature in furnaces of conventional design, for example, batch furnaces, rotary furnaces or shaft furnaces, and optionally maintained at the reaction temperature for a while. The reaction can be carried out at temperautres of from 700 to 1200° C., and preferably at temperatures of from 800 to 1000° C. In general, there is no need for the reaction mixture to be maintained for prolonged periods at the reaction temperature since the reaction proceeds rapidly. In many cases, mere heating to the reaction temperature is sufficient to obtain a superior-grade pigment. Although relatively long residence times of up to around 5 hours do not have any adverse effect, there is generally no need to maintain the temperature for longer than 3 hours. On leaving the furnace, the finished reaction product consists of matted pigment fibres having a diameter of from 0.2 to 0.5 micron, mostly substantially 0.3 micron, and a length of from 1 to 50 microns. In order to recover the pigment fibres, the reaction cake is size reduced, washed with water and the pigment fibres filtered off. Before further use, the product can be dried, aftertreated with the agents and by the methods commonly used in pigment chemistry or directly processed.

In addition to their pronounced fibre form, the white pigments produced in accordance with the invention have high optical performances and show particularly favorable retention values in paper. Accordingly, they are particularly suitable for opacifying papers. By virtue of their high light stability and their white color, however, they can also be used for other applications such as, for example, in lacquers or for pigmenting plastics. The same also applies as regards to the colored products obtained by the process according to the invention. By incorporating certain metals or metal combinations, it is also possible to produce hexatitanates with hitherto unknown properties. Thus, in addition to optical effects, it is also possible to obtain special electrical and magnetic or catalytic effects.

By reducing the products obtained in accordance with the invention, it is possible to obtain alkali metal titanates with a large proportion of trivalent titanium. These titanium bronzes also show interesting optical, electrical, magnetic and even catalytic properties which can be influenced and varied within wide limits by the modifiers present in the starting material. The production of titanium bronzes from the alkali metal hexatitanates according to the invention is carried out by methods known per se of the kind described, for example, in Nature 192, Nov. 11, 1961, 551–552.

The process according to the invention is illustrated by the following examples.

EXAMPLE 1

15.53 g. of $TiO_2$ obtained by the hydrolysis of titanium tetrabutylate, filtering, washing and drying, were mixed by rubbing in a mortar with 4.47 g. of $K_2CO_3$, 5.0 g. of $K_2SO_4$ and 0.447 g. of standard commercial $AlF_3 \cdot aq$ with an $AlF_3$ content of 0.272 g. The mixture contained 61.5% of $TiO_2$, 17.7% of $K_2CO_3$ (molar ratio of $K_2CO_3:TiO_2=1:6$), 19.8% of $K_2SO_4$ as mineralizer and 1.1% of $AlF_3$ as modifier, based on the dry material. The mixture was poured into a corundum crucible, heated for 120 minutes to 900° C. and quickly cooled. The reaction product was crushed in water and rubbed into a paste which was freed from adhering salts by washing. Some of the filter cake was re-suspended in water and split up into the individual fibres by dispersing for 2 minutes with an Ultra-Turrax stirrer. The suspension was examined under an electron microscope for the presence of pigment particles. Approximately 95% of the pigment formed which was identified by X-ray photography as $K_2Ti_6O_{13}$ consisted of fine small fibres with a length of approximately 5 to 30 microns and a diameter of from 0.1 to 0.5 micron.

EXAMPLE 2

The $TiO_2$-hydrolysate sludge accumulating during the hydrolysis of titanium sulphate solutions in the production of $TiO_2$ pigment was used as the $TiO_2$ source. It was washed, filtered and thereafter still contained 8% of $H_2SO_4$ in combined form. This sludge was used in the form of a 30% suspension. 18 g. of this sludge containing 5.4 g. of $TiO_2$ was admixed with 3.62 g. of $Rb_2CO_3$, 0.82 g. of $Rb_2SO_4$ and 0.125 g. of $NH_4F$ and stirred until these components had dissolved. 0.422 g. of $Al(NO_3)_3 \cdot 9H_2O$ in the form of an aqueous solution was introduced with continued stirring. Following thorough admixture, the suspension was dried on a heated rotating cylinder which dipped into the suspension and removed again by a scraper. The reaction mixture formed contained 53.5% of $TiO_2$, 25.8% of $Rb_2CO_3$ (molar ratio $Rb_2CO_3:TiO_2 = 1:6$), 19.8% of $Rb_2SO_4$ as mineralizer and 0.94% of $AlF_3$ as modifier based on the dry material. It was then heated for 120 minutes to 900° C. and further processed as in Example 1. Examination under an electron microscope showed that a rudibium titanate pigment had been formed, of which more than 90% consisted of fibrous particles with a length of from 3 to 15 microns and a diameter of from 0.1 to 0.7 micron.

EXAMPLE 3

169.4 g. of $K_2CO_3$, 140.0 g. of $K_2SO_4$ and 5.44 g. of $CaF_2$ were ground in a ball mill. The pulverized mixture was then stirred into a $TiO_2$ hydrolysate (as in Example 2: 390.6 g. of $TiO_2$) and the mixture homogenized by prolonged stirring. The pasty reaction mixture was then poured in a thin layer into an enamelled pan and dried. The dried product which contained $K_2CO_3$ and $TiO_2$ in a molar ratio of 1:5.4 (after neutralization of the $H_2SO_4$ present in the $TiO_2$ hydrolysate), 27.2% of $K_2SO_4$ as mineralizer and 0.76% of $CaF_2$ as modifier, based on the dry reaction mixture, was then heated to 1100° C. for 3 hours. The fibrous product was recovered as described in Example 1. It consisted of approximately 0.3 micron wide and about 5 to 15 microns long fibers having the composition $K_2Ti_6O_{13}$. The product was then boiled for 6 hours in water and re-examined by X-ray photography. The diffractogramme still corresponded to the compound $K_2Ti_6O_{13}$.

In order to measure the optical performance of this pigment, its lightening power was determined in accordance with DIN 53 192. In this test, 0.15 g. of the pigment to be tested, ground for 15 minutes, are mixed with 5 g. of a blue paste in a color-grinding mill and the lightening occurring determined photometrically from the degree of remission at $560 \pm 10$ nm. The lightening power value can then be read off from a calibration curve. A comparison lithopone with a lightening power of 100 established as the reference value was used as the comparison white pigment for this test. The lightening power of the pigment obtained in accordance with Example 3 amounted to 290.

Under identical test conditions, a standard commercial potassium titanate pigment in fibrous form had a lightening power of 260 to 280.

The retention of the fibrous $K_2Ti_6O_{13}$-pigment in paper was determined by the following test. 0.35 g. of the pigment was dispersed for 1 minute in 620 ml. of water by means of an intensive stirrer. 350 ml. of a bleached sulphite cellulose sludge containing 10 g. of cellulose per liter were added to this suspension and cellulose residues left in the vessel washed out with another 30 ml. of water so that 1 liter of paper mache with pigment was obtained. The paper was produced in a paper plating machine which consisted of a circular sieve with a surface of 326 cm.² for a mesh width of 0.1 mm. with 3600 meshes per cm.², on top of which was placed a cylindrical vessel. A ventilating and evacuation unit was arranged below the sieve. 3 liters of water were introduced into the vessel arranged on top of the sieve. Since all the pipes were closed, the water did not run off through the sieve. The pigment-containing paper mache was then added to the water and the ventilating unit switched on so that air was introduced under pressure upwards through the sieve and the mixture above the sieve was thoroughly mixed. After 15 seconds, ventilation was switched off and the mass left to settle for 15 seconds. The liquid was then removed under suction followed by the continued application of suction for 1 minute. The sheet of paper on the sieve was dried by means of a vacuum press heated to form 80-90° C. In order to determine the quantity of pigment retained, the paper was burnt to ashes and the burning residue weighed. The burning residue in percent, based on the quantity used, gives the retention. The pigment produced in accordance with Example 3 has a retention of 64%. A standard-commercial anatase pigment with isometric pigment particles used under the same test conditions produced a retention of 8%.

EXAMPLE 4

78.1 g. of $TiO_2$ ($TiO_2$ hydrolysate sludge as in Example 2), 29.05 g. of $KOH$ and 2.84 g. of $KF$ were stirred until completely homogenized. 6.12 g. of $Al(NO_3)_3 \cdot 9H_2O$ dissolved in water were added dropwise with continued stirring. The pasty reaction mixture was dried as described in Example 3. The reaction mixture contained 69.4% of $TiO_2$, 19.5% of $KOH$ (molar ratio $$2KOH:TiO_2 = 1:5)$$

9.9% of $K_2SO_4$ as mineralizer (formed through neutralization of the combined $H_2SO_4$) and 1.22% of $AlF_3$ as modifier based on the dry material. The reaction mixture was tempered for 3 hours at 842° C. and thereafter further processed as described in Example 1. The fibrous $K_2Ti_6O_{13}$ pigment formed had a lightening power of 350 and a retention value of 87.1%.

EXAMPLE 5

21.7 kg. of $K_2CO_3$ were added to 50 kg. of $TiO_2$ in the form of $TiO_2$ hydrolysate (according to Example 2), followed by stirring. After the $H_2SO_4$ present in the $TiO_2$ hydrolysate had been completely neutralized, the molar ratio of the residual $K_2CO_3:TiO_2$ amounted to 1:5.4. In addition to the 7.11 kg. of $K_2SO_4$ formed during neutralization, another 17.9 kg. of $K_2SO_4$ were added. 1.09 kg. of $NH_4F$ were also dissolved in the suspension. An aqueous solution of 3.68 kg. of $Al(NO_3)_3 \cdot 9H_2O$ was then added dropwise with stirring to the suspension, resulting in the precipitation of 825 g. of $AlF_3$. The mixture was then dried in a spray dryer at 180° C. to form a lightweight powder. The mixture contained 54.4% of $TiO_2$, 17.5% of $K_2CO_3$, 27.2% of $K_2SO_4$ as mineralizer and 0.9% of $AlF_3$ as modifier based on the dry material.

(a) The dry powder was introduced into an $Al_2O_3$ vessel and heated for 120 minutes to 900° C. in a chamber furnace. The product was thereafter discharged from the furnace, suspended in water, dispersed by means of an intensive stirrer, filtered and washed. More than 95% of the product consisted of fine $K_2Ti_6O_{13}$ fibres. A value of 330 was determined as the lightening power. Retention in the paper amounted to 88.6%.

(b) Heating was carried out over a period of 120 minutes to 1000° C. After working up (as in (a)), a pigment of which more than 90% consisted of $K_2Ti_6O_{13}$ fibres, was obtained, having a lightening power of 315.

To test light stability, laminates were prepared with these two pigments. The following procedure was adopted for this purpose: 100 g. of melamine resin were made into a paste with 60 ml. of distilled water at 60 to 70° C. by means of a glass rod and, following the addition of 50 ml. of ethanol, the resulting paste was stirred with a glass stirrer until the melamine resin had completely dissolved. The solution obtained kept for only 1 day.

12.5 g. of the pigment ground for 15 minutes were weighed into a glass beaker into which 100 g. of the above melamine resin solution were introduced, followed by admixture for 5 minutes with an intensive stirrer (7500 to 8000 r.p.m.).

After the dispersion had been transferred into a porcelain dish, four strips of filter paper (Whatman No. 3) were successively semi-immersed, the impregnated halves fixed in a paper clip and thereafter the other halves immersed. In order to prevent the dispersion from dripping off, both sides of the paper were stripped with a glass rod above the dish. The paper clips were suspended with the impregnated strips hanging from them in a wire frame and left to dry for 20 minutes at 100° C. After cooling, the paper strips were drawn through unpigmented melamine resin solution and stripped as before. Thereafter, the specimens were tempered for 20 minutes in a drying cabinet preheated to 138° C. The four strips of each sample were placed one on top of the other, marked and placed between two clean steel plates. The specimens were pressed for 13 minutes under a pressure of 105 kg./cm.[2] in a hydraulic two-column laboratory handpress with heating and cooling facilities which had been preheated to 149° C. Thereafter, the heating was switched off with the pressure intact and, for cooling to 40° C., the water-cooling system was brought into operation for from 3 to 4 minutes. After a temperature of 40° C. has been reached, the press was opened and the pair of plates with the specimen in between was removed. The pigmented laminate panels were tested to determine lightness before exposure to light and the percentage of greying after exposure.

To this end, the remission of the panels was initially determined on the lower half thereof with an electrical remission photometer using a standardized green filter (Ry filter). The remission value Ry determined is a measure of brightness. Thereafter, the upper half of the panels was covered with an aluminium foil in order subsequently to see the contrast between the exposed and unexposed surface. The covered side was placed on the edge of a rotating plate (diameter 63 cm.; 3 r.p.m.) and, after the specimens had been exposed for 4 hours to the light of 6 Ultra-Vitalux lamps (circular arrangement at a distance of 10 cm. from the rotating plate), the Ry value was measured at the same place on the specimen as before exposure. The percentage greying is expressed as $$\frac{(R_y \text{ before} - R_y \text{ after exposure}) \cdot 100}{R_y \text{ before exposure}}$$

the pigment produced in accordance with Example 5(a) produced a percentage greying of 20%, whilst the pigment obtained in accordance with Example 5(b) produced a percentage greying of 22%. Under the same test conditions, a standard commercial fibrous potassium titanate pigment produced a greying of 65.7% and, hence, was much more sensitive to light.

EXAMPLE 6

A solution of 26.4 g. of $K_2CO_3$, 5.0 g. of $K_2SO_4$ and 2.49 g. of KF was added to 68.6 g. of $TiO_2$ in the form of $TiO_2$ hydrolysate (according to Example 2) followed by the dropwise addition with stirring of a solution of 5.36 g. of $Al(NO_3)_3 \cdot 9H_2O$ in water. The reaction mixture was concentrated by evaporation to dryness in a rotary vacuum evaporator, giving a mass which contained 66.5% of $TiO_2$, 18.04% of $K_2CO_3$ (molar ratio $K_2CO_3$:

$TiO_2$=6.38), 14.3% of $K_2SO_4$ as mineralizer and 1.16% of $AlF_3$ as modifier based on the dry material. The mixture was calcined for 1 hour at 900° C. and then worked up as described in Example 5(a). 95% of the pigment consisted of 0.2 to 0.4 micron thick and 5 to 30 microns long fibres which were identified by X-ray photography as $K_2Ti_6O_{13}$ and which had a lightening power of 305. This pigment had a retention in paper of 83%.

EXAMPLE 7

The effectiveness of different modifiers upon pigment formation was tested. To this end, $K_2CO_3$ was added to $TiO_2$ hydrolysate as the $TiO_2$ source (as in Example 2) so that, following neutralization of the $H_2SO_4$ present in the $TiO_2$ hydrolysate, a $K_2CO_3$:$TiO_2$ ratio of 1:5.4 was obtained. $K_2SO_4$ was added in varying quantities as mineralizer. The metal fluorides acting as fibre-forming modifier were precipitated by dissolving $NH_4F$ in the $TiO_2$ suspension and adding the metals dropwise with stirring in the form of an aqueous solution of their nitrates. The quantities used are shown in Table 1. The suspensions were dried as in Example 3 and the dry substance was reacted by heating to 1100° C. in 140 minutes. After working up (as in Example 1), the tests were evaluated by microscope in order to determine the percentage proportion of fibrous pigment (Table 2). In some cases, lightening power and retention in paper were additionally determined (Table 2). Finally, the analytical composition of some pigments was determined, as was their light stability by the laminate test (Table 3).

In addition to their pronounced fibre form, the $$K_2Ti_6O_{13}$$

pigments produced in accordance with the invention as shown in Table 2 show outstanding optical performance and particularly favorable retention values in papers. By virtue of the simultaneous effect of the high retention and lightening power, papers were opacified with particular effect in pigmenting tests. The pigments produced in accordance with tests 7(b) and 7(l) were used as opacifying agents. The test papers were prepared as described in Example 3 (retention measurement) and their opacity measured in accordance with DIN 53 146.

The degree of remission $\beta_0$ of an individual sheet was determined over a black substrate and $\beta_{00}$, the Y-remission degree of this sheet over a stack of sheets of the same paper which is so thick that it is totally impermeable to light, and the opacity O calculated in accordance with the following formula:

$$O = \frac{\beta_0}{\beta_{00}} \cdot 100\%$$

Opacities of 94.7 to 95.6% were obtained with the test products 7(b) and 7(l). A paper pigmented under the same test conditions with standard commercial anatase produced an opacity of 88.5%.

TABLE 1

| | Quantities of starting substances used in g. | | | | | Compositions of the dried reaction mixture, based on dry substance=100% (percent) | | | | |
|---|---|---|---|---|---|---|---|---|---|---|
| | $TiO_2$ | $K_2CO_3$ | $K_2SO_4$ | $NH_4F$ | $M(NO_3)_x$ | | $TiO_2$ | $K_2CO_3$ | $K_2SO_4$ | $MF_x$ |
| Test No. 7: | | | | | | | | | | |
| a | 66.4 | 28.6 | 5.0 | 0.875 | 2.79 | $Ca(NO_3)_2 \cdot 4H_2O$ | 64.6 | 20.5 | 14.0 | 0.9 | $CaF_2$ |
| b | 50.0 | 21.7 | 17.9 | 0.66 | 2.1 | $Ca(NO_3)_2 \cdot 4H_2O$ | 54.5 | 17.5 | 27.24 | 0.76 | $CaF_2$ |
| c | 50.0 | 21.7 | 17.9 | 0.288 | 1.2 | $Cd(NO_3)_2 \cdot 4H_2O$ | 54.6 | 17.5 | 27.26 | 0.64 | $CdF_2$ |
| d | 50.0 | 21.7 | 17.9 | 1.98 | 6.32 | $Ca(NO_3)_2 \cdot 4H_2O$ | 53.7 | 17.2 | 26.8 | 2.24 | $CaF_2$ |
| e | 50.0 | 21.7 | 17.9 | 0.338 | 1.32 | $Ce(NO_3)_3 \cdot 6H_2O$ | 54.6 | 17.5 | 27.25 | 0.65 | $CeF_3$ |
| f | 50.0 | 21.7 | 17.9 | 1.075 | 3.84 | $Sr(NO_3)_2$ | 53.84 | 17.3 | 26.9 | 1.96 | $SrF_2$ |
| g | 10.0 | 4.32 | 3.58 | 0.453 | 2.03 | $Pb(NO_3)_2$ | 50.8 | 16.2 | 25.4 | 7.6 | $PbF_2$ |
| h | 10.0 | 4.32 | 3.58 | 0.721 | 2.69 | $Th(NO_3)_4 \cdot 4H_2O$ | 50.8 | 16.2 | 25.4 | 7.6 | $ThF_4$ |
| i | 10.0 | 4.32 | 3.58 | 0.455 | 1.99 | $Bi(NO_3)_3 \cdot 5H_2O$ | 51.8 | 16.45 | 26.0 | 5.65 | $BiF_3$ |
| k | 10.0 | 4.32 | 3.58 | 0.626 | 2.74 | $Bi(NO_3)_3 \cdot 5H_2O$ | 50.8 | 16.2 | 25.4 | 7.6 | $BiF_3$ |
| l | 50.0 | 21.7 | 17.9 | 1.09 | 3.68 | $Al(NO_3)_3 \cdot 9H_2O$ | 54.4 | 17.5 | 27.2 | 0.9 | $AlF_3$ |
| m | 55.8 | 24.2 | 20.0 | | 3.44 | KF | 53.1 | 17.0 | 26.6 | 3.27 | KF |
| n | 10.0 | 4.32 | 3.58 | 0.23 | 0.90 | $Co(NO_3)_2 \cdot 6H_2O$ | 54.09 | 17.25 | 27.04 | 1.62 | $CoF_2$ |
| o | 10.0 | 4.32 | 3.58 | 0.306 | 1.10 | $Cr(NO_3)_3 \cdot 9H_2O$ | 54.09 | 17.25 | 27.04 | 1.62 | $CrF_3$ |
| p | 10.0 | 4.32 | 3.58 | 0.239 | 0.83 | $Mn(NO_3)_2 \cdot xH_2O$ (33.8% $MnO_2$) | 54.09 | 17.25 | 27.04 | 1.62 | $MnF_2$ |
| q | 10.0 | 4.32 | 3.58 | | 0.30 | $K_3FeF_6$ | 54.09 | 17.25 | 27.04 | 1.62 | $K_3FeF_6$ |

TABLE 2

| | Percent of K₂Ti₆O₁₃ pigment fibres | Lightening power according to DIN 53 149 | Retention in paper, percent |
|---|---|---|---|
| Test No. 7: | | | |
| a | >95 | 285 | 73 |
| b | 95 | 300 | 75 |
| c | 90 | 270 | (¹) |
| d | 95 | 290 | 72 |
| e | 95 | 295 | 67 |
| f | 90 | 280 | (¹) |
| g | 85 | (¹) | (¹) |
| h | 95 | 290 | (¹) |
| i | 90 | (¹) | (¹) |
| k | 85 | (¹) | (¹) |
| l | >95 | 330 | 88 |
| m | ²5 | 170 | (¹) |
| n | 95 | (¹) | (¹) |
| o | 90 | (¹) | (¹) |
| p | 85 | (¹) | (¹) |
| q | 90 | (¹) | (¹) |
| Anatase pigment | (³) | (⁴) | 8 |
| Standard commercial fibrous potassium titanate pigment | | 260–280 | 43 |

¹ Not determined.
² Rest, wide crystal needles.
³ Untreated.
⁴ For comparison.

TABLE 3

| | Metal fluoride used | Percent of metal theor. on K₂Ti₆O₁₃ | Percent of metal found | Percent of flouride theor. on K₂Ti₆O₁₃ | Percent of fluoride found | Percent greying (laminate test) |
|---|---|---|---|---|---|---|
| Test No. 7: | | | | | | |
| b | CaF₂ | 0.59 | 0.54 | 0.55 | 0.29 | 23 |
| c | CdF₂ | | (¹) | | (¹) | 15 |
| d | CaF₂ | | (¹) | | (¹) | 22 |
| h | ThF₄ | 9.42 | 9.36 | 3.08 | 0.53 | (¹) |
| i | BiF₃ | 7.13 | 7.01 | 1.95 | 0.31 | (¹) |
| l | AlF₃ | 0.437 | 0.45 | 0.92 | 0.23 | 23 |
| m | KF | | | 1.77 | 0.007 | (²) |
| Standard commercial fibrous potassium titanate pigment | | | | | | 68 |

¹ Not determined.
² Turns grey during working up.

What is claimed is:

1. A modified fibrous alkali metal hexatitanate characterized by a content of polyvalent metal ions in an amount of from 0.025 to 30% by weight of polyvalent metal and by a content of fluorine ions in an amount of from 0.05 to 10% by weight of fluorine, said amounts being based on the weight of $TiO_2$ in the alkali metal hexatitanate and said alkali metal being sodium, potassium, rubidium, cesium or a mixture thereof.

2. The modified fibrous alkali metal hexatitanate of claim 1 having a content of polyvalent metal ions in an amount of 0.1 to 15% by weight of polyvalent metal and a content of fluoride ions in an amount of from 0.05 to 3% by weight of fluorine.

3. The modified fibrous alkali metal hexatitanate of claim 1 wherein the polyvalent metal ions are ions of calcium, cadmium, aluminum or a mixture thereof.

4. The modified fibrous alkali metal hexatitanate of claim 1 wherein the polyvalent metal ions are ions of cerium, cobalt, manganese, chromium, iron or a mixture thereof.

5. A process for producing a modified fibrous alkali metal hexatitanate which comprises reacting titanium dioxide or a titanium compound which yields titanium dioxide under the process reaction conditions with at least one alkali metal compound of sodium, potassium, rubidium or cesium which reacts basically under the process conditions, in the presence of a reaction-accelerating amount of a mineralizer which is an alkali metal salt of an oxyacid of sulphur of sodium, potassium, rubidium or cesium and in the presence of a polyvalent metal fluoride in an amount of from 0.1 to 15% by weight, based on the weight of the dry reaction mixture, at a temperature of from 700 to 1200° C.

6. The process of claim 5 wherein said polyvalent metal fluoride is present in an amount of from 0.5 to 5% by weight.

7. The process of claim 5 wherein calcium fluoride, aluminum fluoride, cadmium fluoride or a mixture thereof are employed as polyvalent metal fluoride.

8. The process of claim 5 wherein titanium dioxide or a hydrate thereof is employed.

9. The process of claim 5 wherein titanium dioxide hydrolysate sludge accumulating during the hydrolysis of titanium sulphate is employed.

10. The process of claim 5 wherein said alkali metal compound is an alkali metal hydroxide, alkali metal carbonate, alkali metal hydrogen carbonate or a mixture thereof.

11. The process of claim 5 wherein the alkali metal compound is employed in a molar ratio of alkali metal oxide to titanium compound, calculated as titanium dioxide, of 1:3 to 1:7.

12. The process of claim 5 wherein the alkali metal compound is employed in a molar ratio of alkali metal oxide to titanium compound, calculated as titanium dioxide, of 1:5 to 1:6.

13. The process of claim 5 wherein said temperature is from 800 to 1000° C.

14. The process of claim 5 wherein said reaction accelerating amount is from 3 to 40% by weight, based on the weight of the dry reaction mixture.

15. The process of claim 5 wherein said reaction accelerating amount is from 5 to 30% by weight, based on the weight of the dry reaction mixture.

References Cited

UNITED STATES PATENTS

| 3,484,260 | 12/1969 | Emslie et al. | 106—299 |
| 3,594,205 | 7/1971 | Gulledge et al. | 106—299 |
| 3,442,678 | 5/1969 | Ross | 106—299 |

DELBERT E. GANTZ, Primary Examiner

J. V. HOWARD, Assistant Examiner

U.S. Cl. X.R.

106—300, 308, 309